G. A. LYON.
BUMPER MOUNTING FOR MOTOR CARS.
APPLICATION FILED MAR. 17, 1916.
1,289,491.
Patented Dec. 31, 1918.
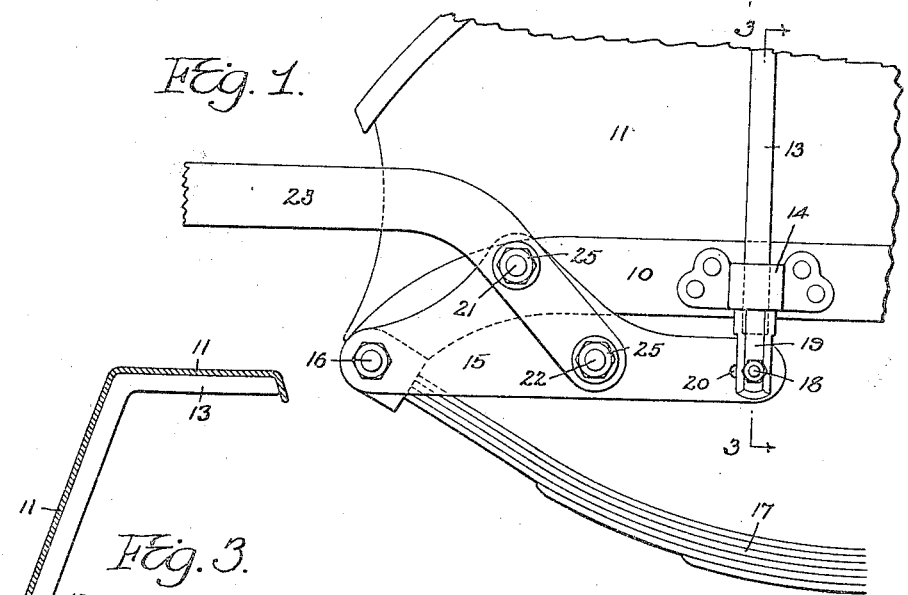
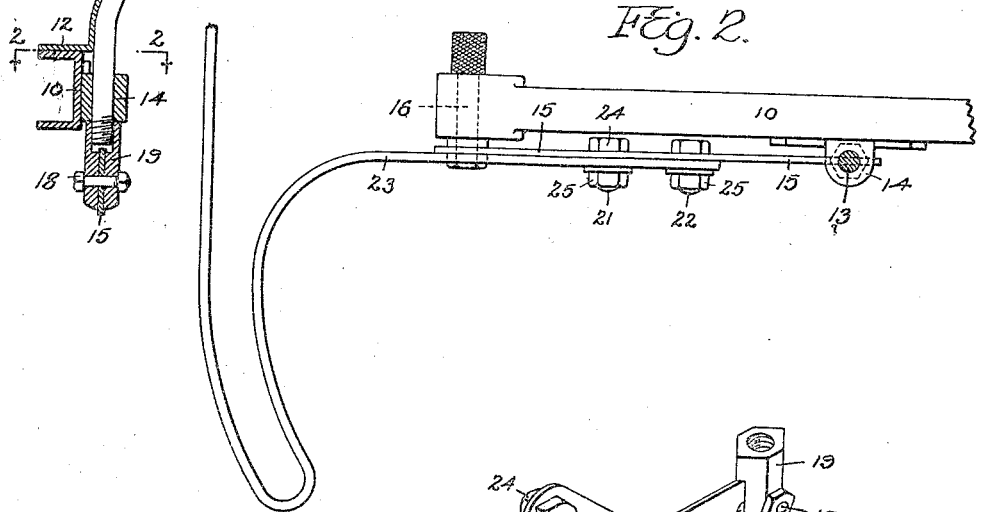
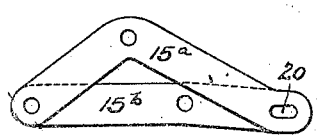
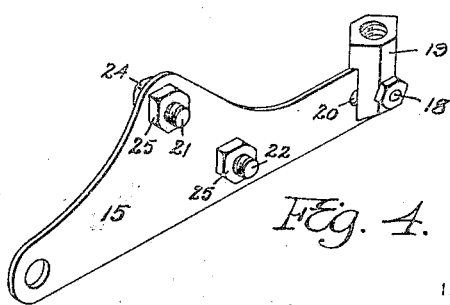
INVENTOR
GEORGE ALBERT LYON
BY HIS ATTORNEY

UNITED STATES PATENT OFFICE.

GEORGE ALBERT LYON, OF PHILADELPHIA, PENNSYLVANIA, ASSIGNOR TO LYON NON-SKID COMPANY, OF PHILADELPHIA, PENNSYLVANIA, A CORPORATION OF PENNSYLVANIA.

BUMPER-MOUNTING FOR MOTOR-CARS.

1,289,491.  Specification of Letters Patent.  Patented Dec. 31, 1918.

Application filed March 17, 1916. Serial No. 84,774.

*To all whom it may concern:*

Be it known that I, GEORGE ALBERT LYON, a citizen of the United States, residing in Philadelphia, Pennsylvania, have invented certain Improvements in Bumper-Mountings for Motor-Cars, of which the following is a specification.

My invention consists of a bumper mounting device designed for use in connection with cars whose side frames have mud guards or other structures associated therewith, in such manner as to prevent the direct application of the bumper bars thereto, the object of my invention being to provide for the ready attachment of the device to the frame preferably by utilization of means with which the car is already provided.

In the accompanying drawing—

Figure 1 is a side view of sufficient of the frame of a motor car, of the type referred to, to illustrate my improved bumper mounting in connection therewith;

Fig. 2 is a top view of the same without the mud guard;

Fig. 3 is a transverse section on the line 3—3, Fig. 1, showing a full section of the mud guard;

Fig. 4 is a perspective view of the bumper mounting device detached from the car frame, and Fig. 5 is a side view illustrating a modification.

In Figs. 1, 2 and 3, 10 represents one of the side frames of a motor car and 11 a mud guard having at the bottom an inwardly projecting flange 12 which rests upon the top of the frame 10 and is held in contact therewith by means of a rod 13 secured to the inner side of the mud guard and passing down through a boss 14 secured to the outside of the frame 10, this rod being threaded at the lower end for the reception of a nut whereby the rod 13 can be drawn down and the flange of a mud guard caused to press vertically upon the upper side of the frame.

In a car of this type the rearwardly extending member of the bumper bar cannot be secured to the frame 10 by means of clamps as in the bumpers shown in my previous applications Serial Nos. 762,548 and 61,018, hence I use, as an attachment for the bumper, a plate 15 mounted at its forward end upon the transverse bolt 16, through the medium of which the forward end of the spring 17 is hung upon the frame member 10 and said plate being mounted at its rearward end upon a transverse bolt 18 which passes through a nut 19, screwed upon the lower end of the rod 13, said bolt being also adapted to a longitudinal slot 20 at the rear end of the plate so as to permit such slight adjustment as may be necessary in the fitting of the parts.

The plate 15 can thus be applied to the frame by the utilization of attaching means already in existence, namely the mud guard rod 13, and the spring supporting bolt 16.

The plate 15, preferably at a point about midway of the length of the same, is increased in depth so as to permit of the formation therein of openings for the reception of transverse bolts 21 and 22 which also pass through openings in the bar 23 of the bumper structure. The latter may be of any available type, for instance that shown in my applications before referred to.

In the bumper shown in the drawing, the rearwardly extending attaching bar has a downwardly inclined rear end, hence the bolts 21 and 22 are separated from one another in the direction of said inclined end, so as to provide separated points of support for the bumper, and thus insure the rigid mounting of the same.

As shown in Fig. 2, the plate 15 is supported at such a distance from the side of the frame 10 as to accommodate between the two the projecting head 24 of the bolt 21, both of the bolts 21 and 22 being provided at their outer ends with nuts 25.

In the drawing, I have shown the bolt holes in the plate 15 as spaced apart both vertically and longitudinally in order to accord with the downward inclination of the rear end of the buffer bar 23. Of course, if the rear end of the bar was bent vertically or extended horizontally the disposition of the bolt holes would be modified accordingly, hence their disposition is unimportant except in so far as they must be separated from one another in the direction of the attaching member of the bar, so as to provide at least two points of attachment in order to maintain the bumper bar in rigid relation to the supporting plate.

Although I have heretofore described, and prefer to use, as a means for mounting the bumper upon the car, a single plate 15 such single plate is not necessary to the broader embodiment of my invention. For instance two separate bars such as shown, respectively, at 15ª and 15ᵇ in Fig. 5, may be employed with like result, hence the term "plate" as used in my claims is to be interpreted broadly enough to cover such modified construction.

I claim:

1. In automobile buffers, buffer supporting plates formed with attaching apertures adjacent their central portions, transverse attaching bolts extending through said apertures to rigidly secure the coöperating buffer attaching members against the corresponding flat sides of said supporting plates, said supporting plates each being formed with a hole at one end through which the transverse spring bolts at the front of the automobile frame members may extend to clamp the front ends of said supporting members to the corresponding ends of the frame and slotted securing nuts adapted to be screwed upon the ends of projecting threaded members on each side of the automobile frame and connecting bolts passing through said securing nuts and through apertures in the rear ends of said supporting plates to rigidly secure them between the slotted portions of said securing nuts.

2. In automobile buffers, buffer supporting plates formed with attaching apertures, transverse attaching bolts extending through said apertures to rigidly secure the coöperating buffer attaching members against the corresponding flat sides of said supporting plates, said supporting plates each being formed with a hole through which the transverse spring bolts at the front of the automobile frame members may extend to clamp said supporting members to the corresponding ends of the frame and slotted securing nuts adapted to be screwed upon the depending ends of said guard supporting rods on each side of the automobile frame and connecting bolts passing through said securing nuts and through apertures in the rear ends of said supporting plates to rigidly secure them between the slotted portions of said securing nuts.

3. In automobile buffers, a buffer having substantially flat sided attaching members formed with attaching apertures, buffer supporting plates formed with corresponding attaching apertures adjacent their central portions, transverse attaching bolts extending through said apertures to rigidly secure said attaching members against the corresponding flat sides of said supporting plates, said supporting plates each being formed with a hole at one end through which the transverse spring bolts at the front of the automobile frame members may extend to clamp the front ends of said supporting members to the corresponding automobile frame members and securing nuts adapted to be screwed upon the ends of projecting threaded members on each side of the automobile frame and connecting bolts passing through said securing nuts and through elongated apertures in the rear ends of said supporting plates to rigidly secure them to the frame.

4. In automobile buffers, a buffer having attaching members, buffer supporting plates formed with attaching apertures adjacent their central portions, transverse attaching bolts extending through said apertures to rigidly secure said attaching members against the corresponding sides of said supporting plates, said supporting plates each being formed with a hole at one end through which the transverse spring bolts at the front of the automobile frame members may extend to clamp the front ends of said supporting members to the corresponding automobile frame members and securing nuts adapted to be screwed upon the ends of projecting threaded members on each side of the automobile frame and secured to the rear ends of said supporting plates to rigidly secure them to the frame.

5. In automobile buffers, a buffer having attaching members, buffer supporting plates formed with attaching apertures adjacent their central portions, transverse attaching bolts extending through said apertures to rigidly secure said attaching members against the corresponding sides of said supporting plates, said supporting plates each being formed with a hole at one end through which bolts at the front of the automobile frame members may extend to clamp the front ends of said supporting members to the corresponding automobile frame members and connecting means coöperating with the rear ends of said supporting plates to rigidly secure them to the frame.

6. In automobile buffers, buffer supporting plates formed with attaching means adjacent their central portions, coöperating attaching means to rigidly secure buffer attaching members to said supporting plates, said supporting plates each being adapted to be secured adjacent one end to the automobile frame members and securing nuts adapted to be screwed upon the ends of projecting threaded members on each side of the automobile frame and connecting bolts to secure said supporting plates to said securing nuts to rigidly fasten them to the frame.

7. In automobile buffers, buffer supporting plates formed with attaching means adjacent their central portions, coöperating attaching means to rigidly secure buffer attaching members against the corresponding sides of said supporting plates, said supporting plates each being adapted to be secured at one end to the forward portions of the automobile frame members and connecting means coöperating with the rear ends of said supporting plates to rigidly secure them to the frame.

In testimony whereof I have signed my name to this specification, in the presence of two subscribing witnesses.

GEORGE ALBERT LYON.

Witnesses:
    KATE A. BEADLE,
    HAMILTON D. TURNER.